Dec. 28, 1943.  C. A. OLCOTT  2,338,053
PROTECTION OF BRAKES EMPLOYED IN SYSTEMS FOR THE EXTRACTION
OF SUGAR FROM SUGAR BEARING MATERIAL
Filed May 20, 1939
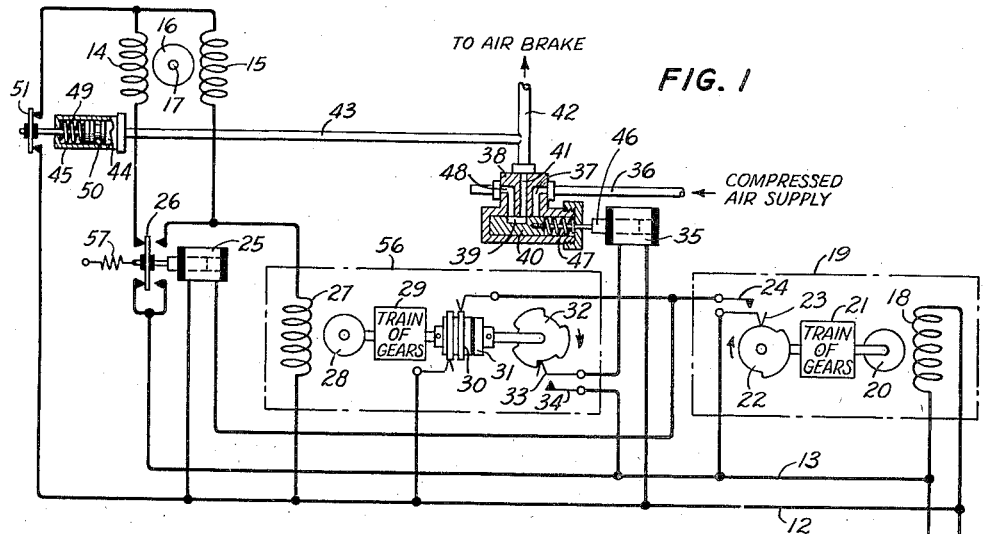
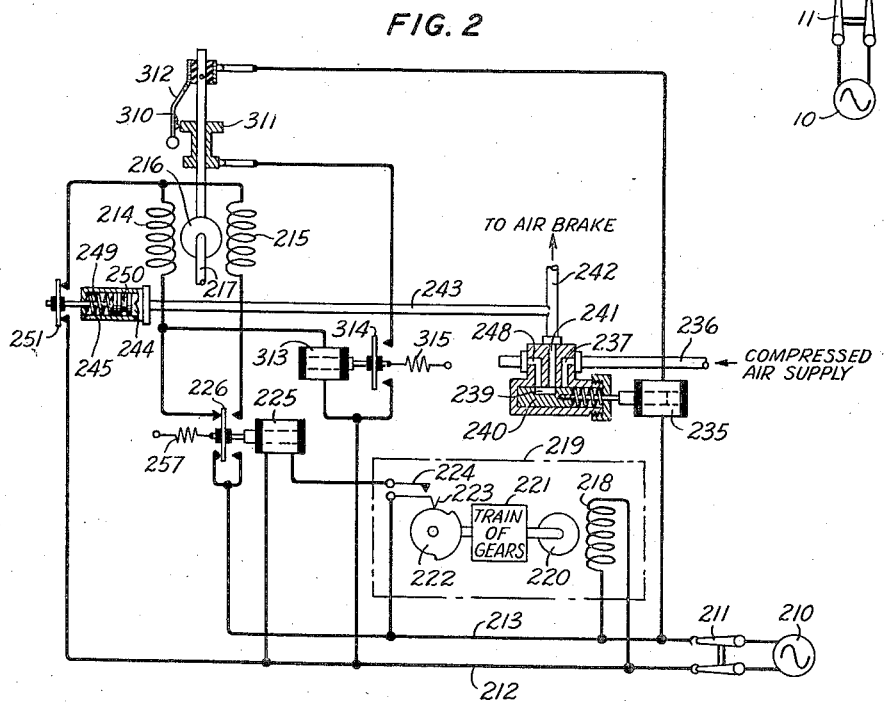
INVENTOR
C. A. OLCOTT
BY
ATTORNEY

UNITED STATES PATENT OFFICE 2,338,053

PROTECTION OF BRAKES EMPLOYED IN SYSTEMS FOR THE EXTRACTION OF SUGAR FROM SUGAR BEARING MATERIALS

Charles A. Olcott, West Milford, N. J.

Application May 20, 1939, Serial No. 274,740

5 Claims. (Cl. 210—72)

This invention relates to braking mechanisms and more particularly to the protection of brakes employed in systems for the extraction of sugar from sugar bearing materials.

An object of this invention is the protection of braking mechanisms used in centrifugal machines against destruction when applied to decelerate the machines.

In the operation of centrifugal machines employed for the extraction of sugar from sugar bearing materials and including a receptacle for the sugar bearing materials which is adapted to be cyclically rotated at high speed and quickly brought to rest, the application of braking mechanisms to decelerate these machines, as previously arranged, is fraught with danger. One of the most frequent causes of trouble is the application of the brake before the speed of the revolving machine has been sufficiently reduced. In a type of motor and braking system widely used in the art, the motor is equipped with two windings, one for driving the motor at high speed and the second for driving the motor at low speed. When the centrifugal which is being driven at high speed under the influence of the high speed winding, is switched after the proper high speed interval so that it is operating under the influence of the low speed motor winding, the energy stored in the rapidly rotating mass as it is being decelerated operates to drive the motor connected to its low speed winding as a generator returning current to the line. As the motor is functioning as a generator, a reverse torque is developed and the generator acts as a brake. When the reverse torque has been applied sufficiently long to reduce the centrifugal to a safe speed, an air pressure brake is applied and simultaneously an air pressure switch functions to open a power supply conductor common to both the high and low speed motor windings.

It has been found, however, that not infrequently the switch which should operate to connect the low speed winding of the motor fails to function properly. The reverse torque is not applied to decelerate the centrifugal and notwithstanding this, the air pressure brake is applied. The result is that the air pressure brake is applied to a rotating mass having considerably more energy than the brake capacity warrants. In the present system of centrifugal operation, wherein the centrifugals are braked down about thirty times per hour, this results in overheating and damage to the brake.

In one embodiment, the invention herein is designed to preclude the operation of the air pressure brake system unless the first brake, or the reverse torque low speed motor winding, has been connected to perform its function of decelerating the centrifugal, so that the air brake may be safely applied.

In this arrangement, the compressed air supply to the air brake is controlled by one of two timers, and the winding of the motor driving this timer is connected in parallel with the low speed or reverse torque brake winding to one side of a source of power. The opposite side of the power supply is extended to a single switch which is common to both the timer winding and the low speed winding. With this arrangement, unless there is an open circuit in the low speed winding branch, which should be quickly detected, the timer controlling the air pressure supply will not function to connect air under pressure to the compressed air brake, unless the reverse torque brake has first been put into operation to perform its function of decelerating the centrifugal from high speed to moderate speed.

In a second embodiment of the invention, wherein but one timer is used, the timer operates to control a switch which disconnects the high speed motor winding and connects the low speed winding, applying the reverse torque to decelerate the centrifugal. When the speed of the centrifugal has been reduced sufficiently, a set of centrifugally operated contacts closes to establish an electric circuit which controls a solenoid operated air valve. The air valve in turn controls the air pressure supply to the brake. Since the centrifugally operated contacts are responsive directly to the speed of the centrifugal and cannot close until the speed has been sufficiently decelerated, the danger of applying the air pressure brake while the centrifugal is operating at too high speed is eliminated.

In an alternative arrangement, a voltmeter relay is connected across the low speed winding of the motor. The relay is set to operate on the voltage condition obtaining in the winding at the instant when the proper speed for applying the compressed air to the brake has been reached. At this instant the voltmeter contacts lock up a local circuit including the winding of the air valve solenoid. The locked-up local circuit may be opened manually or under control of an extra set of contacts on the first timer to disconnect the air brake.

The invention may be more fully understood from reference to the associated drawing in which:

Fig. 1 shows one embodiment of the brake protection arrangement of this invention. In this figure, the winding of the motor controls the timing mechanism, which measures the operation of the centrifugal on the low speed or reverse torque winding, so that the timer cannot operate to connect air under pressure to the brake unless the low speed reverse torque brake has been first connected to decelerate the centrifugal to the proper speed.

Fig. 2 shows a second embodiment of the brake protection arrangement of this invention. In this figure, the low speed reverse torque motor winding first operates to reduce the speed of the centrifugal. When the speed has been sufficiently reduced, a set of centrifugally operated contacts closes to control an air valve connecting air under pressure to the brake.

In Fig. 1, a source of power 10 supplies current through a switch 11 and a pair of conductors 12 and 13 to a high speed winding 14 or a low speed winding 15 of the motor employed for driving a centrifugal for the extraction of sugar from sugar bearing materials. The energization of either the high speed winding 14 or the low speed winding 15 rotates a driving armature 16 of the motor which is fixedly attached to a rotating shaft 17 connected to the centrifugal machine. The centrifugal machine may be of any well known type; for example, that shown in the applicant's copending application, Serial No. 364,402, filed March 27, 1937, is satisfactory for this purpose. The source of power 10 also supplies current to a winding 18 for driving the motor of a timing mechanism enclosed in the dotted configuration 19. The winding 18 is connected in parallel with the conductors 12 and 13 so that initially the connection of power to a winding of the centrifugal motor also results in the actuation of the motor of the timing mechanism 19. The energization of the winding 18 drives an armature 20 connected through a train of gears, indicated by the block diagram 21, to rotate a cam 22. A contact spring 23 is tensioned against the cam 22. The cam 22 has an elevation on its periphery so that during the interval at which the contact spring 23 rides on the elevation of the cam 22, the contact spring 23 engages a contact 24 while at any other time the contact spring 23 and contact 24 are disengaged. The engagement of contact spring 23 and contact 24 results in the energization of a solenoid switch 25.

When the switch 11 is initially actuated to pass current through the conductors 12 and 13, the high speed winding 14 of the centrifugal motor is energized through an armature 26 of the solenoid switch 25. The armature 26 connects the source of power to the high speed winding 14 when the solenoid switch 25 is deenergized, the armature 26 being normally biased by a spring 57 to insure this connection. Simultaneously with the connection of the source of power 10 to the high speed winding 14, the winding 18 of the timing mechanism 19 is energized to start the rotation of the cam 22. During the interval necessary for the proper centrifuging of the sugar bearing materials, measured by the speed of the armature 20 and a proper choice of gear ratios of the timing gears 21, the contact spring 23 remains disengaged from its associated contact 24. At the end of this interval, the contact spring 23 rides on the elevation of the cam 22 to engage the contact 24, resulting in the energization of the solenoid switch 25. The energization of solenoid switch 25 disconnects the source of power 10 from the high speed winding 14 by means of the movement of its associated armature 26 against the bias effected by the spring 27. The movement of the armature 26 also effects the connection of the source of power 10 to the low speed winding 15 of the centrifugal motor. The armature 16 of the motor and the shaft 17 connected to the centrifugal rotate at a low speed. This action has the effect of applying a reverse torque, slowing down the machine and motor to a considerable extent and returning a certain amount of power to the line. In practice, this deceleration or regenerative braking of the centrifugal usually requires from 15 to 20 seconds with machines running at approximately 1800 R. P. M.

Simultaneously with the beginning of the regenerative braking by the energization of low speed winding 15, a second timer starts to operate which, after a predetermined period, causes the motor driving the centrifugal to be disconnected from the line and also energizes a solenoid valve which admits air to a cylinder applying a friction brake to the centrifugal, using any of the well known air brakes for this purpose. The timer is so arranged that the friction brake does not operate if the regenerative braking is not functioning. This second timing mechanism which insures that the friction brake is applied only if the regenerative braking is functioning is contained within the dotted diagram 56. The second timing mechanism is started by the energization of a winding 27 which is connected across the lines 12 and 13 when the solenoid 25 is energized to apply regenerative braking to the centrifugal as a result of current passing through the low speed winding 15. The energization of winding 27 results in the rotation of an armature 28 mechanically connected through a train of gears 29 to a driving member 30 of a magnetic clutch. A driven member 31 is associated with the driving member 30 of the magnetic clutch and rotates a cam 32. The driving member 30 and driven member 31 of the magnetic clutch are arranged to mesh, thereby mechanically connecting the armature 28 of the motor of the second timer through the train of gears 29 with the cam 32 in response to the engagement of the contact spring 23 and contact 24 of the first timer. A contact spring 33 is tensioned against the periphery of cam 32. The cam 32 has elevations on its periphery so that when the contact spring 33 rides upon these elevations it engages a contact 34, whereas at all other the contact spring 33 is disengaged from the contact 34. The engagement of the contact spring 33 and contact 34 energizes a solenoid 35. The actuation of solenoid 35 results in the passage of compressed air from a supply not shown through a conduit 36, a channel 37 of a valve 38, a notch 39 in a piston 40, a channel 41 to a tube 42 to an air brake not shown and through a tube 43 to a chamber 44 of a solenoid operated valve 45. The piston 40 is connected to a core 46 of the solenoid 35 and is normally tensioned by a spring 47 to connect through channel 41, the notch 39 and a channel 48, the tubes 42 and 43 to the atmosphere and to prevent the compressed air supplied through the channel 37 from being applied to either the brake or the chamber 44 of the solenoid valve 45. The actuation of solenoid 35, however, overcomes the bias of the spring 47 to disconnect the tubes 42 and 43 from the atmosphere and to supply compressed air in the manner heretofore described. The passage of compressed air into the chamber 44 of the solenoid valve 45 overcomes the bias of a spring 49 which is normally tensioned against a piston 50 to connect by means of an armature 51 the source of power 10 to the high speed winding 14 and low speed winding 15. When compressed air through the tube 43 is forced into the chamber 44, this normal bias by the spring 49 is overcome to disconnect the source 10 through the line 12 from the high speed winding 14 or the low speed winding 15.

Initially, when the source of power 10 is connected to the lines 12 and 13, the high speed winding 14 is energized and the cam 22 begins to rotate as a result of the energization of winding 18. After a predetermined interval, the contact spring 23 engages the contact 24 to energize solenoid 25. Simultaneously, the engagement of contact spring 23 and contact 24 causes the meshing of driving member 30 and driven member 31 of the magnetic clutch to mechanically connect the armature 28 with the cam 32 of the second timer. The energization of solenoid switch 25 applies regenerative braking to the rotating centrifugal armature 16 as a result of the passage of current through low speed winding 15. If the low speed winding 15 is connected as a result of the energization, armature 28 of the second timer revolves. Since, as heretofore noted, the driving member 30 and driven member 31 of the magnetic clutch are meshed, the cam 32 also rotates. The elevations and depressions on the cam 32 are so arranged that, after a predetermined period, the contact spring 33 engages the contact 34. This period depends upon the time required for the regenerative braking resulting from the passage of current through the low speed winding to decelerate the centrifugal sufficiently for the safe application of the air brake. Usually the time required is from 15 to 20 seconds. If the regenerative braking is initially applied, a predetermined period after this application the contact spring 33 engages the contact 34 to actuate solenoid 35. The actuation of solenoid 35 results in compressed air being supplied to the friction brake to stop the centrifugal and to the solenoid valve 45 to insure disconnection of both the high speed winding 14 and the low speed winding 15 from the source of supply of current 10. In the event that the mechanism fails to function on its prescribed schedule, the friction brake does not operate if the regenerative braking is not functioning. At times the relay mechanism, such as the solenoid 25 shown in the specific embodiment, fails to connect the source of power 10 to the low speed winding 15. This failure may be due to an open wire in the solenoid or other mechanism or a failure of the first timer to make its connection properly. In such situations, the motor continues to run at high speed. However, since the second timer 56 does not operate unless the high speed winding 14 is disconnected and the low speed winding 15 is applied, the friction brake does not operate. In the system shown, regardless of the failure of the mechanism for applying the regenerative braking, the air brake does not function until after a predetermined period from the start of the application of the regenerative braking.

In Fig. 2, a system of decelerating a centrifugal is shown in which regenerative braking is first applied and after the centrifugal has been sufficiently reduced in speed, a friction brake operates to stop the rotation of the centrifugal. The regenerative braking of the system in Fig. 2 is substantially the same as that shown in Fig. 1. Current is supplied from a source 210 over conductors 212 and 213 through a switch 211 to a high speed winding 214 or a low speed winding 215 of the motor rotating a centrifugal machine. An armature 216 of the centrifugal motor rotates a shaft 217 integral therewith to operate the centrifugal. Initially the high speed winding 214 is energized. Simultaneously, a winding 218 of a timer 219 is energized to rotate an armature 220 which in turn controls the rotation of a cam 222 through a train of timing gears 221. The cam 222 has a segment on its periphery which controls a contact spring 223 which rides on the periphery of the cam 222. When the contact spring 223 rests on the elevated segment of the cam 222, it engages a contact 224 to energize a solenoid switch 225. The solenoid switch 225 controls by its actuation an armature 226 to disconnect the source of power from the high speed winding 214 and connect the source of power to the low speed winding 215 of the centrifugal motor. The armature 226 is normally biased by a spring 257 so that when solenoid switch 225 is deenergized, the source of power 210 is connected to the high speed winding of the motor. As in the system shown in Fig. 1, the elevated portion of the cam 222 of the timer 219 is constructed so that after a predetermined interval necessary for the centrifuging of a sugar bearig material, the contact spring 223 engages contact 224 to energize solenoid switch 225 which results in the deenergization of the high speed winding 214 and the application of the regenerative braking by the connection of the power supply to the low speed winding 215.

When the speed of the shaft 217 is reduced sufficiently, a contact 310 engages a conducting collar 311. The contact 310 is fixedly attached to a centrifugal governor 312 rigidly held to the shaft 217. The speed of the shaft 217 at which the contact 310 engages the conducting collar 311 is that at which it is desirable to apply the friction brake to the centrifugal. A solenoid 235 controls a piston 240 having a notch 239 therein to supply compressed air through a tube 236, channel 237, notch 239, channel 241 to an air brake through tube 242 and to a chamber 244 of a solenoid valve 245 through a tube 243, the actuation of solenoid 235 resulting in the supply of compressed air to both the air brake and chamber 244 of the solenoid valve. The admission of air through the tube 242 applies a friction brake to the centrifugal, using any of the well known air brakes for this purpose. The passage of compressed air to the chamber 244 forces a piston 250 to overcome the normal bias of a spring 249 and, by means of an armature 251, disconnect the source of current 210 from high speed winding 214 or low speed winding 215 of the centrifugal motor. When the solenoid 235 is deenergized, the compressed air is withdrawn from the air brake and chamber 244 of the solenoid valve 245 through tubes 242 and 243 respectively, and channel 241, notch 239, and a channel 243 to the atmosphere. Further, the deenergization of relay 235 results in preventing the compressed air from being applied both to the air brake and solenoid valve 245.

A solenoid 313 is energized when the source of current 210 is connected to the high speed winding 214. When the solenoid 313 is deenergized, an armature 314 is biased by a spring 315 to connect the source of current 210 to the solenoid 235 upon the engagement of contact 310 with the conducting collar 311. For the solenoid 235 to become energized and to apply the friction brake to the centrifugal, it is necessary that the source of power 210 be disconnected from the high speed winding 214 and the centrifugal be reduced to a safe speed as theretofore determined by the adjustment of the centrifugal governor 312 and the conducting collar 311.

At the start of a cycle of operation of a centrifugal, the high speed winding 214 is energized. Simultaneously the armature 220 and cam 222 rotate. After a predetermined interval required for the centrifuging of the sugar bearing material, contact spring 223 engages contact 224 to energize solenoid 225. The armature 229 of solenoid 225 disconnects the source 210 from the high speed winding 214 and from the solenoid 313, and connects the source 210 with the low speed winding 215 to regeneratively brake the centrifugal. If the high speed winding is disconnected from the source and the speed of the centrifugal is sufficiently reduced, solenoid 235 is energized upon the engagement of the contact 310 and conducting collar 311 to apply compressed air to the air brake through tube 242 and to the solenoid valve 245 through the tube 243. The friction brake is, as a result, applied and by means of the actuation of the armature 251 of the solenoid valve 246, the source of power 210 is disconnected from the low speed winding 215. In the event that the high speed winding 214 is not disconnected after the predetermined interval for which the timer 219 is adjusted, the friction brake is not applied due to the energization of relay 313 and the disengagement of contact 310 and conducting collar 311. Accordingly, regardless of any failure in any part of the system, such as the timer or relay 225, the friction brake is not applied until the high speed winding is deenergized and the centrifugal has been reduced to a predetermined speed.

In certain cases it may be preferable to operate the air supply mechanism under control of a voltmeter relay. Advantage may be taken of the fact that while the reverse torque winding 15 of Fig. 1 or 215 of Fig. 2 is in circuit and the motor is functioning as a generator, due to the decelerating speed of the centrifugal, a variable voltage is impressed across the winding. The voltage corresponding to the speed at which it is safe to apply the air pressure brake may be determined and the voltmeter relay may be set to close and lock a local circuit including the winding of the air valve solenoid. The locked circuit may be opened manually by a hand switch or automatically under control of an added pair of contacts on a timer when the cycle of operations is to be repeated. In the case of alternating current centrifugal motors, an alternating current voltmeter relay may be connected across the motor windings or, if it is preferred, a small rectox rectifier in series with a resistance or with the primary of a transformer may be shunted across the resistance terminals or to the secondary of the transformer.

Advantage may also be taken of changing current as well as voltage conditions in the circuit through the reverse torque motor winding due to the changing speed of the centrifugal. The characteristics of the current at the instant at which it is desired to apply the friction brake may be determined and a relay selectively responsive to this specific current condition may be connected to the circuit either in series or by a suitable shunt to control the connection of air under pressure to the air brake.

While the friction brake is shown as air operated, other means such as electrical or mechanical devices can be used to apply the friction brake.

While preferred embodiments of this invention have been illustrated and described, various modifications may be made therein without departing from the scope of the appended claims.

What is claimed is:

1. A centrifugal machine for the separation of sugar crystals from the mother liquid, said machine comprising a rotating portion including a receptacle for the mother liquid which is adapted to be cyclically rotated and quickly brought to rest, an electric motor for driving said rotating portion, said motor having high speed and low speed windings, timing means set into operation on the starting of said motor, means controlled by said timing means for interrupting the high speed operation of said machine after a predetermined time interval, electric circuit means controlled by said timing means and operated thereby at the end of said predetermined time interval for effecting regenerative braking of said rotating portion by energizing said low speed winding, a friction brake of limited power dissipating capacity, means for applying said friction brake to said rotating portion, and means set into operation simultaneously with the application of said regenerative braking means for controlling the application, after a delay interval, of said friction brake, whereby said friction brake is protected from application to a load beyond its power capacity.

2. A combination in accordance with claim 1 including a circuit essential to the high speed operation of said motor and interlock means responsive to the application of said friction brake to disable said circuit.

3. In combination with a centrifugal machine for the extraction of sugar from sugar bearing materials, said machine comprising a rotating portion including a receptacle for said materials which is adapted to be cyclically rotated at high speed and quickly brought to rest, an electric motor for driving said rotating portion, means for regeneratively braking said rotating portion, an electrical contacting device centrifugally controlled in accordance with the speed of rotation of said rotating portion in such a way that said contacting device is operative on reduction of the speed of rotation to a predetermined value, a friction brake adapted for only low speed braking of said rotating portion, a pneumatic system for applying said friction brake, a valve in said system adapted to control the application of said friction brake, and means for operating said valve in response to the operation of said contacting device.

4. In a centrifugal machine for the extraction of sugar from sugar bearing materials, said machine comprising a rotating portion including a receptacle for said materials which is adapted to be cyclically rotated at high speed and quickly brought to rest, a motor for rotating said portion, high and low speed windings on said motor, switching means for connecting the same electric power source successively to said high speed winding for high speed operation of said machine and to said low speed winding for regenerative braking thereof, a plurality of electrically driven timing means for fixing the intervals of said connections including a driving motor winding on one of said timing means connected in parallel with said low speed winding, a friction brake for said machine, and means for automatically applying said friction brake, said last-mentioned means being responsive to the operation of said one timing means.

5. In a centrifugal machine for the extraction of sugar from sugar bearing materials, said machine comprising a rotating portion including a receptacle for said materials which is adapted to be cyclically rotated at high speed and quickly brought to rest, a motor for rotating said portion, means including a low speed winding for said motor for regeneratively braking said machine, a friction brake for said machine, automatic timing means for normally applying said regenerative braking means and said friction brake successively, and a protection device for said friction brake comprising means interlocking the application of said friction brake with the operation of said regenerative braking means.

CHARLES A. OLCOTT.